Patented Jan. 26, 1932

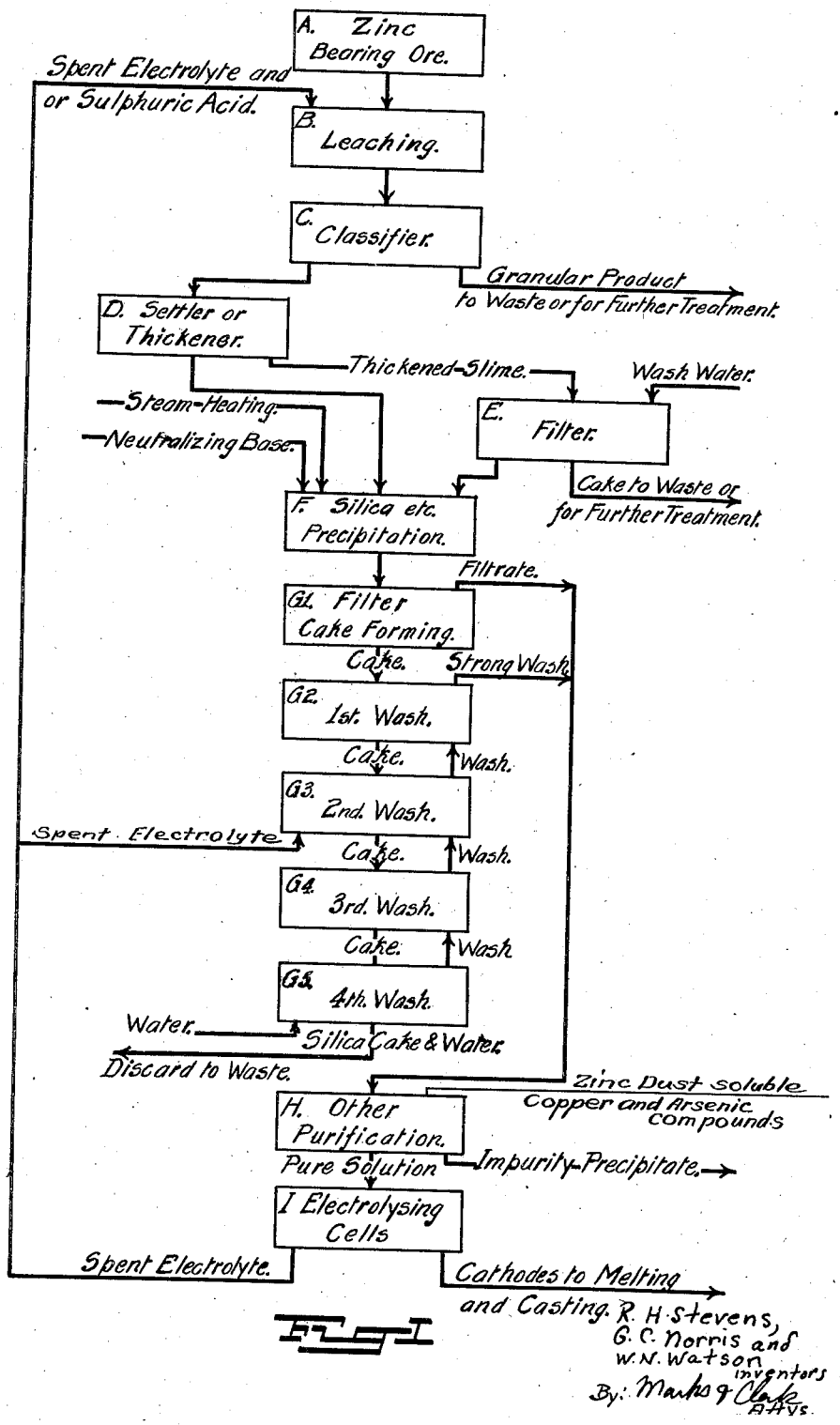

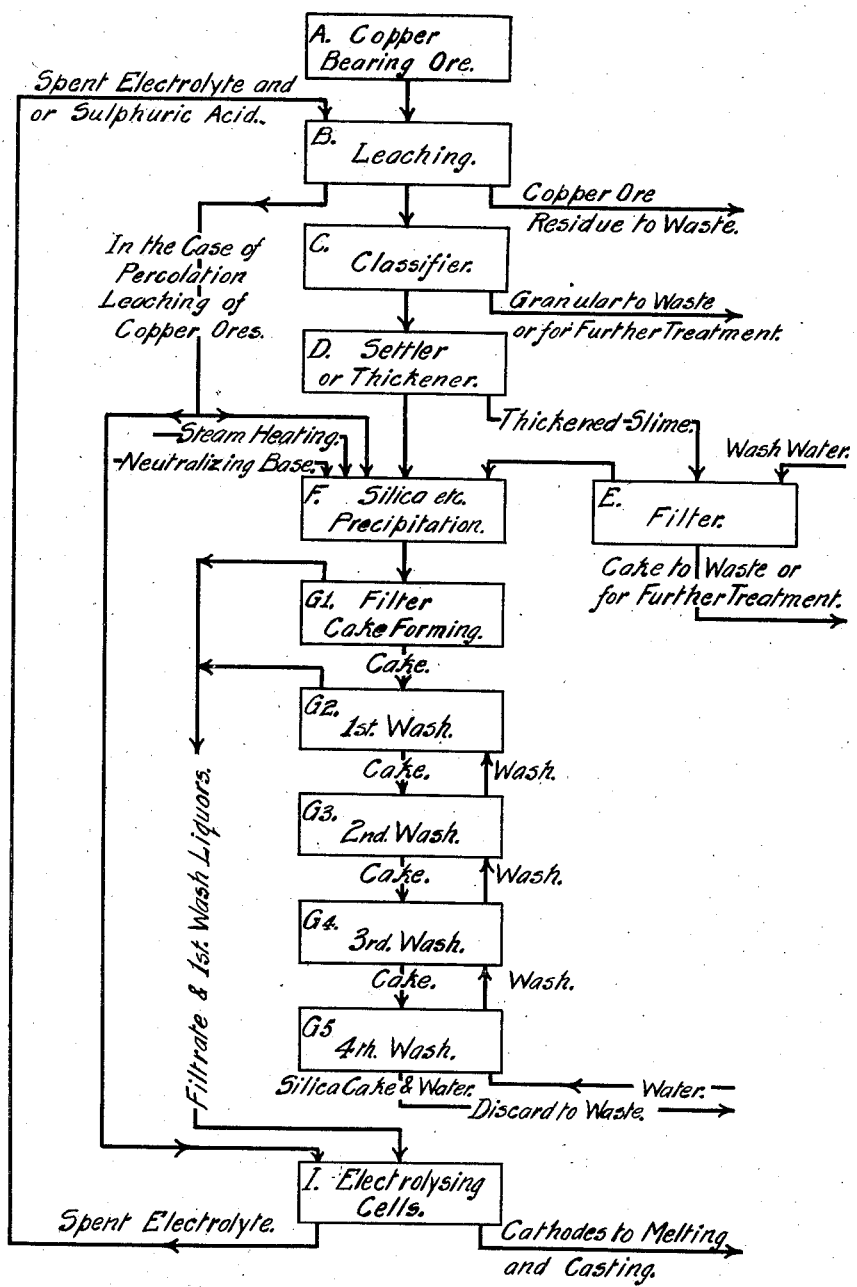

1,843,006

UNITED STATES PATENT OFFICE

ROYALE HILLMAN STEVENS, GERALD CHAD NORRIS, AND WILLIAM NELSON WATSON, OF BROKEN HILL, NORTHERN RHODESIA, ASSIGNORS TO RHODESIA BROKEN HILL DEVELOPMENT COMPANY LIMITED, OF BROKEN HILL, NORTHERN RHODESIA

REMOVAL OF SILICA FROM METAL-BEARING SOLUTIONS

Application filed September 24, 1926, Serial No. 137,621, and in Southern Rhodesia April 7, 1926.

The present invention relates to the treatment of metal-bearing solutions containing notable amounts of dissolved silica, with or without ferric iron or alumina e. g. from 3 to 35 grams per litre of dissolved silica, for the separation of such impurities from the valuable metal-bearing solution.

A special application of the invention is to the acid treatment of ores of zinc, vanadium, or copper containing notable amounts of acid soluble silica. The term "ores" is used in this specification in a broad sense to include such materials as oxidized ores, roasted ores, roasted concentrate, tailing, slime, slag, and other metalliferous materials.

In the usual hydrometallurgical treatment of zinc ores by leaching with acid to form a solution from which the metal is subsequently to be recovered by electrolysis, the solution usually contains silica together, in some cases, with ferric iron and alumina. The precipitation of such impurities from the solution is effected by neutralizing the solution with a basic material such as zinc oxide, zinc dross, lime, finely ground limestone or the like. The precipitates thus formed are bulky and gelatinous and for that reason are difficult to deal with, especially when the said impurities are present in the solution in relatively high concentrations such as from 3 to 35 grams silica per litre as cited above.

Such precipitates entrain large proportions of the metal-bearing solution and are difficult to remove from the solution by settlement and/or filtering. In fact with high concentrations of silica in the solution, the precipitation treatment as usually practiced is liable to result in a mass of gelatinous precipitate in which substantially the whole of the valuable solution is entrained and from which recovery of the metal-bearing solution has hitherto been impracticable.

Moreover, in cases where the filtration or settlement of the silica precipitate has been practicable, the precipitate usually carries with it considerable amounts of the valuable metals both as residual solution and as insoluble material precipitated by or present in the basic material used. The methods hitherto practiced for recovering such residual valuable metal from the silica precipitate, for example, repeated re-pulping and filtration have not proved satisfactory for the treatment of precipitates formed from solutions of high silica concentration.

In the case of copper ores, the copper sulphate solution obtained by leaching the ores with sulphuric acid usually contains silica, iron, alumina and other impurities dissolved from the ores. By the cyclic use of the solution in the process the impurities accumulate to such a concentration as to require that a portion of the solution be withdrawn from the circuit at intervals, the withdrawn solution being treated with metallic iron for the precipitation and recovery of the contained copper, the resulting solution being discarded to waste.

Such a procedure involves a distinct economic loss owing to the use of iron and the loss of sulphuric acid in the discarded solution, and also the necessity of retreating the cement copper to convert its copper content into ingot form for the market.

When copper ores undergoing treatment contain acid soluble silica and the solutions for the treatment are used cyclically, there is the danger of the silica reaching such a concentration in the circulating solution as to cause the silica to "gel" in the solution at the leaching or at other steps in the process, and such gelling causes difficulties in the working of the process, as mentioned above in reference to zinc ores.

Our invention provides an economic means for the substantially complete separation of the valuable metal bearing solution from the bulky gelatinous and difficultly filterable precipitate of silica, which results when metal bearing solutions containing this impurity is neutralized with a basic material. The invention consists in converting the bulky, gelatinous and difficultly filterable precipitate of silica with or without, iron, alumina and the like, to a granular, easily filterable form by heating the gelatinous precipitate to a temperature of 50° to 65° C. preferably about 65° C. with agitation and in the presence of a small excess of a basic material and thereafter filtering or otherwise separating the precipitate from the resulting pulp.

When lower temperatures than those specified above are employed, the conversion of the precipitate from the gelatinous to the granular easily filterable form is incomplete, to the extent that the rate of filtering and the thoroughness of washing are not materially improved.

When temperatures above 65° C. are employed, an economic loss results owing to the extra expense incurred in heating the solution, and no material advantage is gained either in the amount of excess basic material required for the conversion or in filtering and washing the precipitate by employing such higher temperatures.

The presence of some excess of basic material is necessary for successful granulation of the precipitate, the granulation apparently depending upon the basicity of the solution. For example when zinc oxide is added to zinc sulphate solution at the temperatures above stated, sufficient of it dissolves to produce the requisite condition of basicity. When other basic materials, such as lime etc., are used these produce basic zinc compounds which function similarly to the zinc oxide just mentioned.

Thorough agitation of the gelatinous precipitate during granulation is important in order to effect complete contact of the gelatinous particles with the basic solution and also in order to maintain the slight excess of basic material in suspension in the solution.

Our invention further consists in effecting the substantially complete separation of the valuable metal contents by subjecting the silica impurity filter cake from which the bulk of the metal bearing solution has been filtered under basic conditions, to weak acid and water washes by filtering weak acid and water washes through the cake, this procedure being practicable by virtue of the granular nature of the precipitate imparted by the means above described. By this wash treatment the remainder of the solution held in the cake together with undissolved acid soluble zinc, vanadium, or other valuable metal in the cake, are readily recovered and a final filter cake obtained for discharge which is substantially free of these metal values.

The following is an example of the invention as applied to the electrolytic recovery of zinc from zinc ores containing considerable amounts of acid soluble silica, reference being made to Fig. I of the accompanying drawings which shows the flow sheet of the process.

Step "A" indicates the supply of ore to be treated.

Step "B" indicates the leaching of the ore with spent electrolyte from the electrolyzing cells, to which sulphuric acid for make up purposes may be added.

The leaching operation is preferably carried out in a tank in which the pulp is agitated by means of mechanically actuated impellers as opposed to using the "Pachuca" type of tank. The use of air is avoided with the view to conserving in the solution heat which is required later in the process.

At the finish of the leaching operation it is preferred that the acidity of the soluton be left at 2 to 5 grams of free acid per litre, caluclated as sulphuric acid.

Step "C" indicates the separation, by classification, of the sand from the leach pulp which is received from step "B".

Step "D" indicates the settlement of the slime pulp received from the classifiers. Continuously operated thickeners are used for settlement when the concentration of the silica in the solution permits. However, when the silica concentration exceeds 5 grams per litre it is preferred to use settlers of the intermittently operated type to avoid the difficulties arising from "gelling" of the silica in the solution. In this case, the use of intermittent settlers is advantageous from the point of view of being able to withdraw all solution and settled pulp from the settling tank at each cycle. In continuously operated thickeners, there are certain dead zones where solution remains undisturbed in the tank unduly long; and also there is always a bed of thickened pulp resting on the bottom of the tank, two conditions which tend to induce "gelling" of the silica, particularly when solutions of high silica concentration are being dealt with.

Step "E" indicates the filtration and washing of the thickened pulp from step "D". The filtrate is passed forward to join the overflow solution from step "D" and the filter cake is discharged.

In some cases if the slime residue contains no metals of value, and/or is of small bulk it may be practicable for the whole of the slime pulp from step "C" to be passed directly to step "F."

Step "F" indicates the precipitation of silica with or without iron, alumina, and other impurities from the solution and the novel procedure for the conversion of the gelatinous precipitate to a granular easily filterable form. The solution from step "D" and from step "E" is heated, preferably by means of steam, to a temperature of 50° to 65° C., a temperature of 65° C. being preferred. If the concentration of the silica in solution permits, the heating may be done by means of steam coils immersed in the solution. However, with solutions of high silica concentration it is preferable to heat by means of live steam injected into the solution, for the reason that when coils are used in this case, the silica "gels" on the coils and greatly reduces the rate of heat transmission to the solution from the coils.

In this step a neutralizing basic material such as, in the case of zinc sulphate solutions, zinc oxide, zinc dross, oxidized zinc ore, lime, limerock or the like, is added. There is added a slight excess of base over that required to neutralize all free acid and to render the solution neutral to test with methyl orange indicator, and the solution is agitated until the resulting granulation of the gelatinous precipitate is completed; this point being satisfactorily determined by filtering a sample of the pulp on filter paper, the solution filtering rapidly through the paper when granulation of the precipitate is complete.

Phosphorus, if present in the solution, may be removed together with the other impurities at this stage according to the method as described in application for Letters Patent for "Phosphorus," 137,622.

The precipitation of the silica etc., is best carried out in a tank in which the pulp is agitated by means of mechanically actuated impellers, as opposed to the "Pachuca" type of tank, to avoid the cooling resulting from the use of air agitation; furthermore, mechanical agitation produces a precipitate which is more suitable for filtration than that resulting when air agitation is employed.

The time for treatment usually occupies about one hour; but to provide a factor of safety it is advisable to continue the operation for a total period of one and a half hours.

Steps G1 to G5 indicate the novel procedure for the separation of the solution with its metal values from the worthless precipitate by means of filtration and washing.

The filter cake is formed in step G1 and is maintained on the filter leaf throughout the several washing steps G2—G5 and until finally discarded upon the completion of step G5. The type of filter employed is preferably that in which the filter basket is transportable through a series of tanks, and in the flow sheet each step G1 to G5 inclusive represents such a tank.

The filtrate from G1 passes to step H and the filter basket with its load of impurity filter cake, is transferred to wash tank G2.

In wash tank G2 the filtrate from wash tank G3 is used as wash solution, being drawn into the cake from which it displaces residual entrained circuit solution. The filtrate from G2 is passed forward to join the filtrate from G1, and the filter basket with its load of filter cake is then transferred to wash tank G3.

In wash tank G3 the filtrate from G4 is used as wash solution, this wash solution having added to it spent electrolyte or sulphuric acid. The filtrate from this washing operation passes forward to serve as wash solution in G2 and the filter basket with its load of cake is then transferred to wash tank G4.

In wash tank G4 the filtrate from wash tank G5 is used as wash solution. The filtrate from G4 to which sulphuric acid is added as described above is passed forward to serve as wash solution in G3. The filter basket with its load of filter cake is then transferred to wash tank G5.

In wash tank G5, water is used as wash solution and the filtrate is passed forward to serve as wash solution in G4. The filter basket is then removed from G5 and the wash cake from which metal values have been substantially dissolved and displaced is discarded to waste.

The discarded cake consists substantially of the impurity precipitate in association with the water wash last mentioned.

It may be mentioned that it is good practice to add discarded cake to the wash solution in each of the wash tanks in amount sufficient to render the liquors slightly muddy, the suspended solids serving to seal up any small cracks that may develop in the filter cake during washing.

It will be noted that the operation of filtering and washing in steps G2 to G5 involves the countercurrent principle of washing, water entering the circuit only at G5.

Approximate suitable characteristics of filtrates are as follows:—Filtrate from G1 is neutral; filtrate from G2 ranges from neutral at the start to slightly acid at the finish of the washing operation owing to the acidity of the wash liquor coming from G3 which acidity is at first completely neutralized by the base in the G2 cake and then less completely neutralized as the base is dissolved; the filtrate from G3 contains from 4 to 6 grams free acid per litre due to the fresh acid added in this step; that from G4 contains from 4 to 6 grams free acid per litre which was carried forward into this step with the filter cake and has been washed out therefrom, and fresh acid is added to bring its strength up to 8 to 12 grams per litre before it is used as wash liquor in G3; that from G5 contains from 2 to 4 grams per litre of free acid, which has been washed out of the cake.

It is to be understood that the foregoing strengths of acid in filtrates are mentioned merely to illustrate the principle of the operations, the leading principle being to add the fresh acid required for solution of available metal values in the cake to the wash liquor of an intermediate wash tank in the series such as the second wash tank, the amount added being such that the filtrate going forward from the first wash tank finishes neutral or slightly acid.

By following the above procedure, filter cakes containing as low as, or lower than 1% water soluble and 1% acid soluble zinc, can be obtained for discard.

We have found that by conducting the operations of precipitation, filtering and washing as described, solutions of high silica concentration, as for example, from 3 to 35 grams silica per litre, can be successfully adapted to the usual hydro-metallurgical processes for the treatment of ores of zinc and the resulting final silica precipitate is fit for discard.

The filterates from G1 and G2 which pass forward in the process usually contain small quantities of metallic imprities such as cadmium, nickel, cobalt which are deleterious to the final electrolyzing step. These impurities if present are eliminated in step H by any suitable means such as precipitation by addition of zinc dust and soluble copper and arsenic compounds, and removal of the precipitate. In step I the pure solution is electrolyzed and cathode zinc is produced; the spent electrolyte being returned to step "B".

The filter cloth of the filters used for filtering the silica precipitate can be reconditioned for use by removing the filter from service and allowing it to dry out in the air, or by blowing or drawing warm air around or through the filter cloth, such a drying operation causing the precipitate in the pores of the cloth to contract in size and take on a sandy nature, with the result that when the filter is again put into service the filtering properties of the cloth are restored and filtration proceeds at a normal rate.

It is preferable that the silica precipitate should be filtered by vacuum filtration and that the applied vacuum on the filter leaves should be no more than that necessary to hold the cake firmly on the filter surface, a vacuum of 15" to 20" mercury fulfilling this condition. By conducting the filtering operation in this manner there is less tendency for the pores of the filter cloth or medium to become blinded.

It may be mentioned that when dealing with zinc sulphate solutions carrying from 10 to 20 grams dissolved silica per litre it is advisable to limit the zinc concentration of the solution to about 95 grams per litre maximum to avoid the possibility of premature gelling of the silica in the solution during the settling operation. When the silica concentration exceeds 20 grams per litre and approaches 30 grams per litre, it is found advisable to limit the zinc concentration to about 85 to 90 grams zinc per litre. However, in practice it is unusual to have silica concentrations exceeding 20 grams per litre, which consideration readily permits the holding of zinc concentration at 90 to 95 grams per litre.

Fig. II illustrates the application of the invention to copper ores. As the complete elimination of impurities is not so vital in the case of copper ores as in the case of zinc ores part of the leach solution may be taken directly to the electrolytic cells I.

The remainder of the leach solution passes to the precipitation step F and the precipitate is acid washed in steps G1, G2, G3, G4, G5.

Silica together with, ferric hydrate and other impurities are thereby removed and the ferric iron is prevented from building up in the circuit solution. The filtrates from steps F and G1 pass to the electrolyzing cells I.

In dealing with copper ores, the silica problem is not usually so pronounced as when dealing with zinc silicate ores. Thus the usual concentration of 60 grams copper per litre can safely be practiced when copper sulphate solutions are being dealt with.

In some practices it is customary to neutralize the slightly acid leach solution for the precipitation of silica, iron etc., at the leach stage and without first separating the leach residue from the solution. In such a case the gelatinous precipitate is associated with the leach residue. Now in the usual event of its being desired to re-leach the residue from the first or neutral leach, at a comparatively high acidity for the purpose of extracting remaining metal values from the leach residue, the presence of the gelatinous silica etc. in the final residue renders impracticable the separation of the solution from such residue by filtration. The present invention may be applied to such cases to condition the silica in the final acid leached residue and render the residue easily filterable and readily washable by either acid or water as desired.

We claim:

1. The process of converting to granular form a gelatinous precipitate of silica obtained from a metal-bearing solution, which consists in subjecting the precipitate to a temperature between 50° and 65° C. and to agitation in the presence of basic material in excess of the amount necessary to neutralize free acid, until a granular and readily filterable precipitate of silica is formed, and then separating the solution from the precipitate by filtration.

2. The process of converting to granular form a gelatinous precipitate of silica obtained from a metal-bearing solution, which consists in subjecting the precipitate to a temperature of about 65° C. and to agitation in the presence of basic material in excess of the amount necessary to neutralize free acid, until a granular and readily filterable precipitate of silica is formed, and then separating the solution from the precipitate by filtration.

3. The method of recovering residual undissolved valuable constituents from precipitate obtained by neutralizing acid metal-bearing solution with a base, which consists in forming the precipitate as a filter cake and maintaining the cake while subjecting it to acid washing in a series of filtration steps comprising removing the filtrate from the first step, using the filtrate from each later step as wash liquor in the next preceding step, adding fresh acid to the wash liquor of an intermediate step, and in the last step displacing residual liquor in the cake by water and thereafter discharging the cake with its contained water.

4. The method of recovering residual undissolved valuable constituents from a silica precipitate obtained by neutralizing with an excess of basic material an acid metal-bearing solution containing silica as an impurity, such method consisting in forming the precipitate as a filter cake under basic condition, filtering acid liquor through the cake so as to dissolve and remove its residual undissolved valuable constituents and maintaining the cake intact while so filtering acid liquor through it and thereby preventing reversion of silica to the gelatinous form and so preserving the filterability of the cake notwithstanding the presence of acid.

5. The process for the production of a granular precipitate of silica from acid metal bearing solutions containing silica as an impurity and for the recovery of residual undissolved valuable constituents from the precipitate, which consists in treating the solution by agitation in the presence of basic material in excess of the amount necessary to neutralize the acid and at a temperature between 55° C. and 60° C., whereby the granular precipitate of silica is produced, then filtering the basic pulp and thereby forming the precipitate into a filter cake under basic conditions, in that form subjecting it to acid washes by filtering acid liquor through the undisturbed filter cake, thereby dissolving residual valuable acid soluble constituents and preventing reversion of silica to gelatinous form and so preserving the filterability of the cake, then treating the liquor which has passed through the filter cake for the recovery of the constituents dissolved therein.

6. The method of precipitating silica from acid metal bearing solutions, which consists in treating the acid solution with an amount of basic material in excess of that required to neutralize free acid, agitating the resulting precipitate in the solution, while maintaining the solution at a temperature between 55° and 65° C., and until a granular and readily filterable precipitant of silica is formed, and then separating the solution from the precipitate by filtration.

7. The method of precipitating silica from acid metal-bearing solutions, which consists in treating the acid solution with an amount of basic material in excess of that required to neutralize free acid, agitating the resulting precipitate in the solution, while maintaining the solution at a temperature of about 65° C. and until a granular and readily filterable precipitate of silica is formed, and then separating the solution from the precipitate by filtration.

In testimony whereof we affix our signatures.

ROYALE HILLMAN STEVENS.
GERALD CHAD NORRIS.
WILLIAM NELSON WATSON.